UNITED STATES PATENT OFFICE 2,146,642

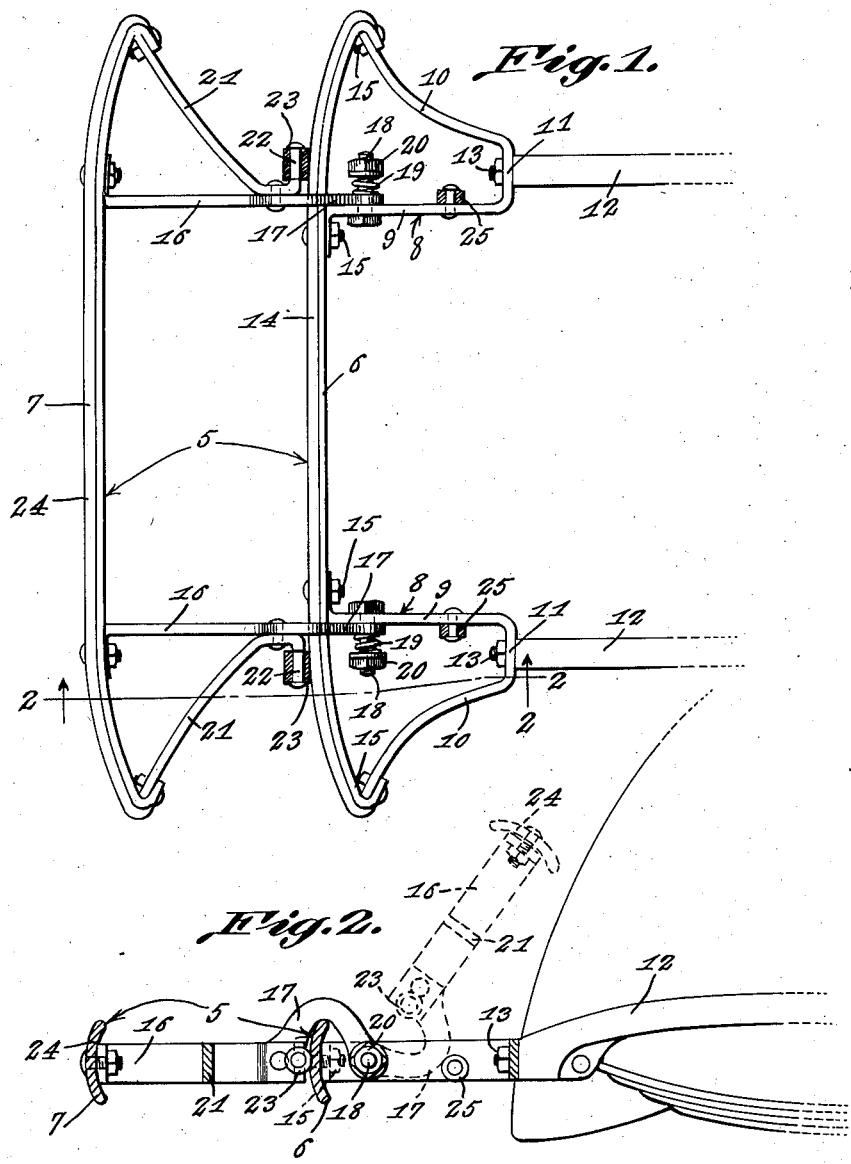

BUMPER

Wallace P. Mueth, St. Louis, Mo.

Application June 20, 1938, Serial No. 214,781

2 Claims. (Cl. 293—55)

My invention relates to improvements in automotive devices and more particularly to bumpers.

One of the principal objects of my invention is to provide a bumper equipped with extensible means whereby the vehicle to which the bumper is attached may be parked and the bumper extended so as to determine the distance between the parked vehicle and an adjacent vehicle, thereby always assuring sufficient distance between parked vehicles to enable said vehicles to be readily moved from parked position.

Another object of my invention is to provide a device of the above described character which is simple in construction, durable in use, efficient in operation, easy of attachment to motor vehicles already in use without modifying the same, and economical in manufacture.

Other objects and advantages will be apparent from the following description, appended claims and annexed drawing.

Referring to the drawing wherein like reference characters designate like parts throughout the several views:

Figure 1 is a top plan view of my invention illustrating the latter attached to a frame portion of a motor vehicle.

Figure 2 is a sectional view taken on the line 2—2 of Figure 1.

It is a well known fact that in the use of present type bumpers, due to limited parking space and congested parking area, once a vehicle is parked the adjacent vehicles both at the rear and forward part of the parked vehicle make it almost impossible to move the parked vehicle until the adjacent vehicles have been moved. To overcome this serious objection and disadvantages I provide, as illustrated in the drawing, a bumper construction 5 adapted for attachment to the front and/or rear ends of a vehicle chassis comprising main and auxiliary bumpers 6 and 7 respectively.

The main bumper 6 is fashioned with a pair of spaced brackets 8 fashioned with outwardly extending inner and outer arms 9 and 10 respectively, integrally connected together at one of the ends thereof by a transversely extending section 11 secured to the spaced end portions 12 of a chassis frame of the vehicle by means of nuts and bolts 13 as clearly illustrated in the drawing. The free or outer ends of the arms 9 and 10 are secured to respective end sections of a transversely extending bumper bar 14 by means of nuts and bolts 15.

The auxiliary bumper 7 is fashioned with a pair of inner arms 16 fashioned with arcuate shaped end sections 17 extending over and receiving between the respective ends thereof the upper sections of the bar 14.

The outer ends of said sections are pivotally connected to the outer end sections of the arms 9 by bolts 18 extending therethrough and equipped with tension springs 19 and nuts 20, said springs serving to maintain the arms 16 in adjusted position relative to the arms 9. Fixed to the outer faces of the arms 16 adjacent the sections 17 are outer arms 21 fashioned with transversely extending sections 22 having rotatably mounted thereon rollers 23 for engaging the outer face of the bar 14 whereby to tension said arms 16 relative to the bar 14 when said arms 16 are in forwardly extending position. The arms 21 are provided with outwardly and laterally extending ends to which is fixed a transversely extending auxiliary bumper bar 24 fixed to the outer ends of the arms 16 as clearly illustrated in Figure 1. Mounted on the outer side faces of the arms 9 intermediate the ends thereof are rollers 25 for engaging the sections 17 when the auxiliary bumper 7 is pivoted towards the chassis frame members whereby to limit the movement thereof.

In use, the auxiliary bumper 7 being in the position illustrated in dotted lines in Figure 2, said auxiliary bumper is pivoted forward of the main bumper bar 14, the upper face of the latter engaging the inner face of the section 17 thereby decreasing the available parking space for an adjacent vehicle and permitting said auxiliary bumper to be actuated to raised position to provide sufficient space for the vehicle to which it is attached to be moved out of parking position relative to the adjacent vehicle.

What I claim is:

1. A device of the character described, comprising, a main bumper equipped with brackets adapted to be secured to the chassis of a vehicle, an auxiliary bumper fashioned with a pair of arcuate shaped arms pivotally connected to said brackets and overlying said main bumper whereby to dispose said auxiliary bumper forwardly of said main bumper and in a common plane therewith to increase the parking area occupied by said vehicle, and means carried by one of said bumpers and engaging the other bumper whereby to maintain said auxiliary bumper in adjusted position when extended forwardly of said main bumper.

2. A device of the character described, comprising, a main bumper equipped with brackets adapted to be secured to the chassis of a vehicle, an auxiliary bumper fashioned with a pair of arms pivotally connected to said brackets whereby to increase the parking area occupied by said vehicle, and rollers pivotally mounted on said auxiliary bumper for engaging said main bumper whereby to maintain said auxiliary bumper in extended forward position relative to said main bumper.

WALLACE P. MUETH.